United States Patent
Song

(10) Patent No.: US 7,835,243 B2
(45) Date of Patent: Nov. 16, 2010

(54) PROTECTIVE SYSTEM AND METHOD FOR DATA WRITE OF AN OPTICAL DRIVE

(75) Inventor: Fong-Hwa Song, Tucheng (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 988 days.

(21) Appl. No.: 11/345,315

(22) Filed: Feb. 2, 2006

(65) Prior Publication Data
US 2006/0245323 A1 Nov. 2, 2006

(30) Foreign Application Priority Data
Apr. 27, 2005 (TW) .............................. 94113354 A

(51) Int. Cl.
*G11B 7/00* (2006.01)

(52) U.S. Cl. .................. 369/53.34; 369/44.13
(58) Field of Classification Search ............... 369/53.34
See application file for complete search history.

(56) References Cited

U.S. PATENT DOCUMENTS

| 6,934,230 B2* | 8/2005 | Choi ..................... 369/47.33 |
| 7,057,985 B1* | 6/2006 | Kobayashi et al. ........ 369/47.28 |
| 2002/0196717 A1* | 12/2002 | Masui et al. ............. 369/44.29 |
| 2003/0123350 A1* | 7/2003 | Kim ..................... 369/47.22 |
| 2003/0231569 A1* | 12/2003 | Tonami et al. ........... 369/53.34 |
| 2004/0202079 A1* | 10/2004 | Oki ....................... 369/59.2 |

* cited by examiner

*Primary Examiner*—Peter Vincent Agustin
*Assistant Examiner*—Emily Frank
(74) *Attorney, Agent, or Firm*—Bacon & Thomas, PLLC

(57) ABSTRACT

A protective system and method for data write of an optical disk drive, which produces a pseudo synchronization signal for the optical disk drive to perform a write operation on an optical disk. First, a write target sector is determined and a current sector of the optical disk is monitored. Next, it is determined whether a wobble synchronization signal is possibly extracted from the optical disk; if not, the pseudo synchronization signal is produced. Finally, the optical drive is driven to perform the write operation on the optical disk.

8 Claims, 5 Drawing Sheets

PROTECTIVE SYSTEM AND METHOD FOR DATA WRITE OF AN OPTICAL DRIVE

BACKGROUND OF THE INVENTION

1. Field of the Invention

The present invention relates to data write of an optical disk and, more particularly, to a protective system and method for data write of an optical disk drive.

2. Description of Related Art

For typical computer or multimedia devices, an optical drive such as a CD-ROM, CD-RW, DVD-ROM or DVD-RW is standard equipment to allow a user to read data from an optical disk or write data into the optical disk.

FIG. 1 is a schematic diagram of a write module of a typical readable/writable optical disk drive. As shown in FIG. 1, the write module includes a servo device 110 and an encoder 120. The servo device 110 performs read/write (RW) operations on an optical disk 130 and controls associated analog circuit operations, while the encoder 120 processes associated digital signals.

FIG. 2 is a timing diagram for an optical disk drive to perform a write operation. As shown in FIG. 2, when the optical disk drive performs a write operation on an optical disk, it first determines a target sector. Next, the servo device 110 performs a jump-track operation to find a target track. Due to there being no record sector on a new optical disk, it requires reading a wobble signal on the optical disk as a feedback signal for rotational control of a spindle motor of the servo device 110. In this case, the servo device 110 is in a WBL mode, and the encoder 120 is in an idle mode. After the jump-track operation is finished, the servo device 110 performs a search-track operation to simultaneously detect a sector located at a position of the target sector minus one (TargetSector-1) in order to allow the encoder 120 to prepare data (Encoder Prepare) and the servo device 110 is switched to a write mode in advance. Next, when the target sector is presented, the encoder 120 generates a write signal to perform the write operation (Encoder Write).

When the optical disk drive is in the write mode, proper data can be recorded into the optical disk in case that a wobble synchronization signal Wsync obtained by the optical disk is matched with an encoder subcode frame synchronization (ESFS) signal of the encoder 120. However, due to the vibration phenomenon produced by the optical disk drive in rotation and the poor signal quality on the optical disk, the wobble synchronization signal Wsync cannot be obtained from the optical disk, resulting in that the previous sector (target sector-1) and the target sector cannot be detected. Thus, data cannot be written into the optical disk. Therefore, it is desirable to provide an improved protective system and method to mitigate and/or obviate the aforementioned problems.

SUMMARY OF THE INVENTION

The object of the present invention is to provide a protective system and method for data write of an optical drive, which can avoid the prior problem that a vibration caused by a typical optical drive in rotation or data cannot be written in an optical disk due to the poor signal quality, and further increase the write yield of the optical disk.

In accordance with one aspect of the present invention, there is provided a protective system for data write of an optical drive, which produces a pseudo synchronization signal in order to allow the optical disk drive to perform a write operation on an optical disk. The system includes a wobble synchronization detection and count device, a synchronization protector and a write controller. The wobble synchronization detection and count device receives a wobble synchronization signal and a wobble synchronization status. A target synchronization match signal is output when the wobble synchronization status is at ready, and conversely a synchronization miss signal is output when the wobble synchronization status is at fail. The synchronization protector is connected to the wobble synchronization detection and count device and produces the pseudo synchronization signal when receiving the synchronization miss signal. The write controller is connected to the wobble synchronization detection and count device and the synchronization protector, and produces a write signal when receiving the target synchronization match or pseudo synchronization signal, thereby driving the optical disk drive to perform the write operation on the optical disk.

In accordance with another aspect of the present invention, there is provided a protective system for data write of an optical drive, which produces a pseudo synchronization signal in order to allow the optical disk drive to perform a write operation on an optical disk. The system includes a wobble synchronization detection and count device, a synchronization protector and a write controller. The wobble synchronization detection and count device receives a wobble synchronization signal and a wobble synchronization status. A synchronization miss signal is output when the wobble synchronization status is at fail. The synchronization protector is connected to the wobble synchronization detection and count device and produces the pseudo synchronization signal when receiving the synchronization miss signal. The write controller is connected to the wobble synchronization detection and count device and the synchronization protector, and produces a write signal when receiving the pseudo synchronization signal, thereby driving the optical disk drive to perform the write operation on the optical disk.

In accordance with a further aspect of the present invention, there is provided a protective method for data write of an optical drive, which produces a pseudo synchronization signal in order to allow the optical disk drive to perform a write operation on an optical disk. The method includes the steps of: (A) determining a write target sector; (B) monitoring a current sector of the optical disk; (C) determining whether a wobble synchronization signal is possibly extracted from the optical disk; (D) producing the pseudo synchronization signal when step (C) determines that the wobble synchronization signal cannot be extracted from the optical disk; (E) driving the optical disk drive to perform the write operation on the optical disk.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
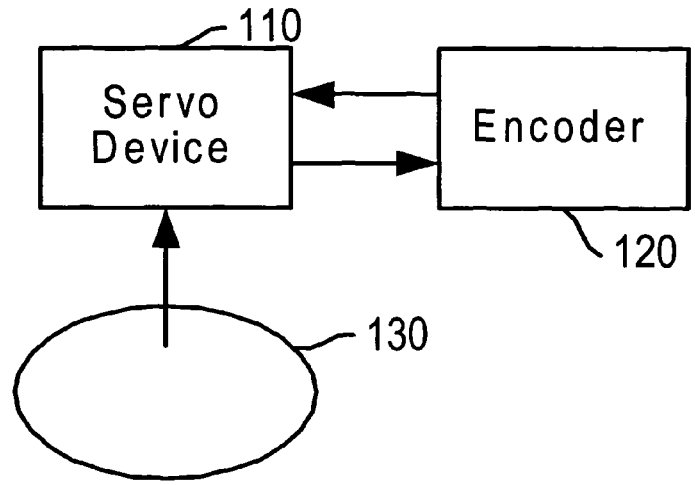
FIG. 1 is a schematic diagram of a write module of a typical readable/writable optical disk drive.
Figure 2:
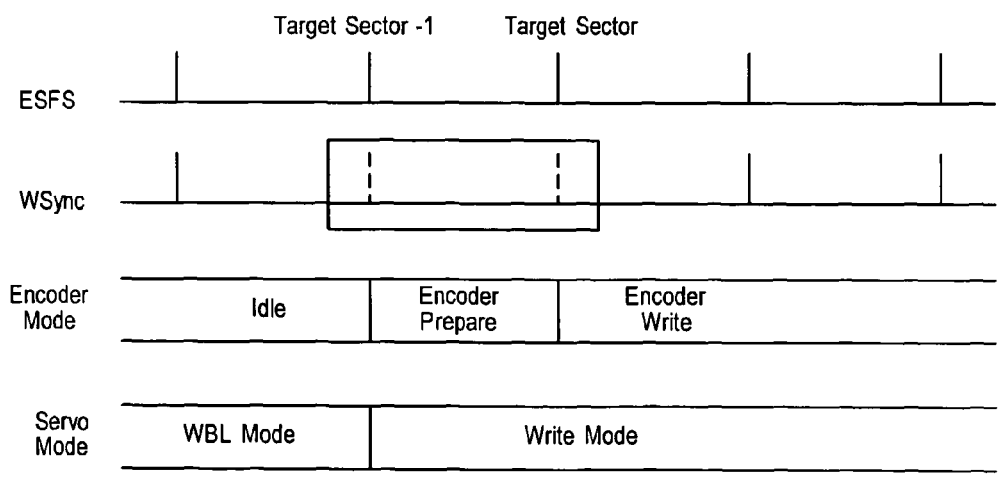
FIG. 2 is a timing diagram for a typical optical disk drive to perform a write operation.
Figure 3:
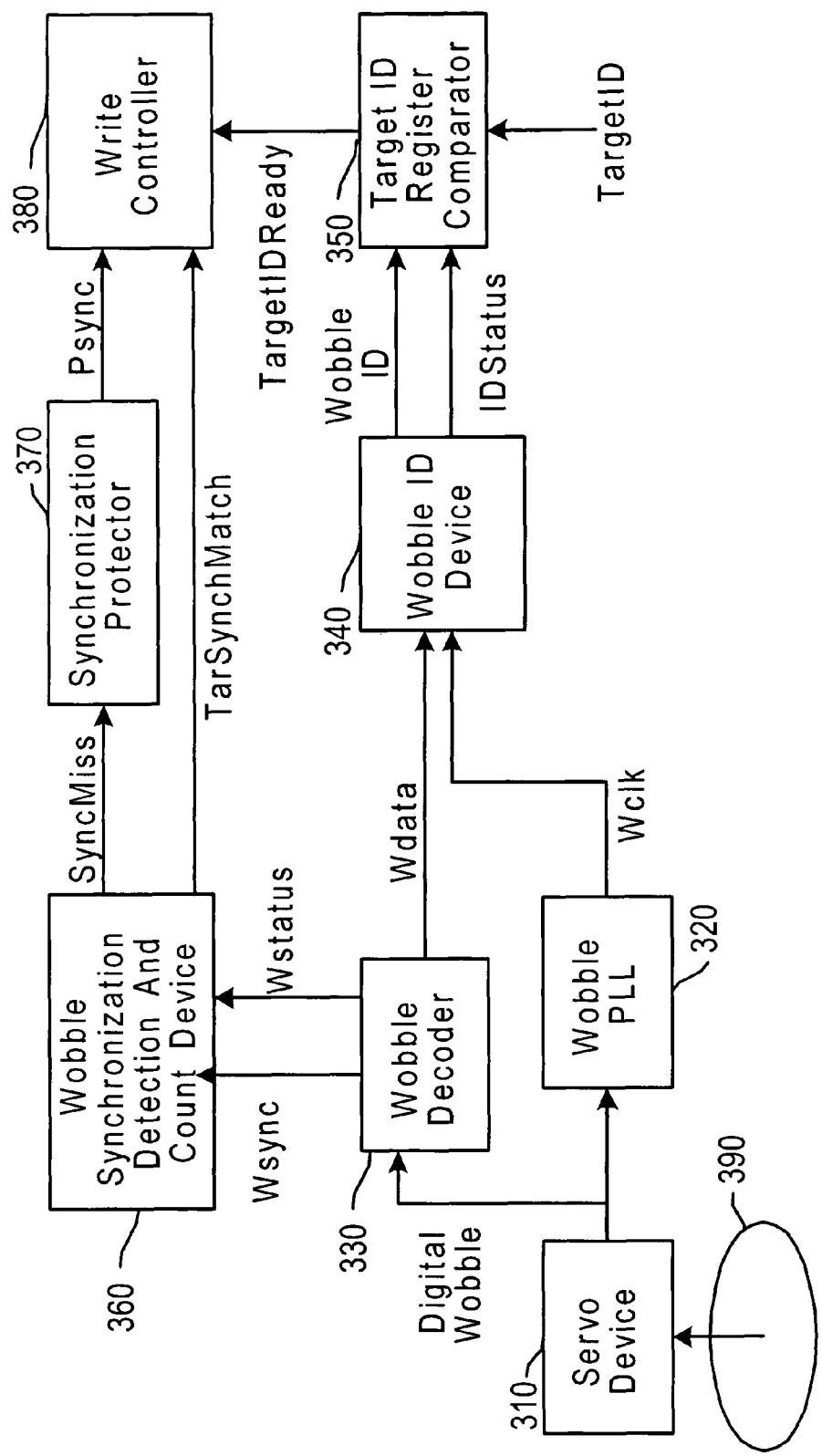
FIG. 3 is a block diagram of a protective system for data write of an optical disk drive in accordance with the invention.

FIG. 3 is a block diagram of a protective system for data write of an optical disk drive in accordance with the invention. As shown in FIG. 3, the system includes a servo device 310, a wobble phase locked loop (PLL) 320, a wobble decoder 330, a wobble identification device 340, a target identification register comparator 350, a wobble synchronization detection and count device 360, a synchronization protector 370 and a write controller 380.

As shown in FIG. 3, the servo device 310 reads a wobble signal from an optical disk 390 and converts the wobble signal read into a digital wobble signal through an internal slicer (not shown). The wobble decoder 330 is connected to the servo device 310 in order to extract a wobble synchronization signal Wsync, a wobble synchronization status Wstatus and a wobble data Wdata from the digital wobble signal. The wobble synchronization status Wstatus has both ready and fail status to indicate a status of the signal Wsync.

The wobble PLL 320 is connected to the servo device 310 in order to extract a wobble clock Wclk from the digital wobble signal, which can be achieved by an over-sampling technique.

The wobble synchronization detection and count device 360 is connected to the wobble decoder 330 in order to receive the signals Wsync and Wstatus. When the signal Wstatus is at ready status, it indicates that the optical disk drive can properly obtain the high-quality signal Wsync from the optical disk. In this case, the device 360 outputs a target synchronization match signal TarSyncMatch. Conversely, when the signal Wstatus is at fail status, the device 360 outputs a synchronization miss signal SyncMiss.

The synchronization protector 370 is connected to the device 360. When the protector 370 receives the signal SyncMiss, it indicates that the optical disk drive cannot properly obtain the high-quality signal Wsync from the optical disk due to a vibration caused by the optical disk drive in rotation or a poor signal on the optical disk. In this case, the protector 370 produces a pseudo synchronization signal Psync.

Figure 4:
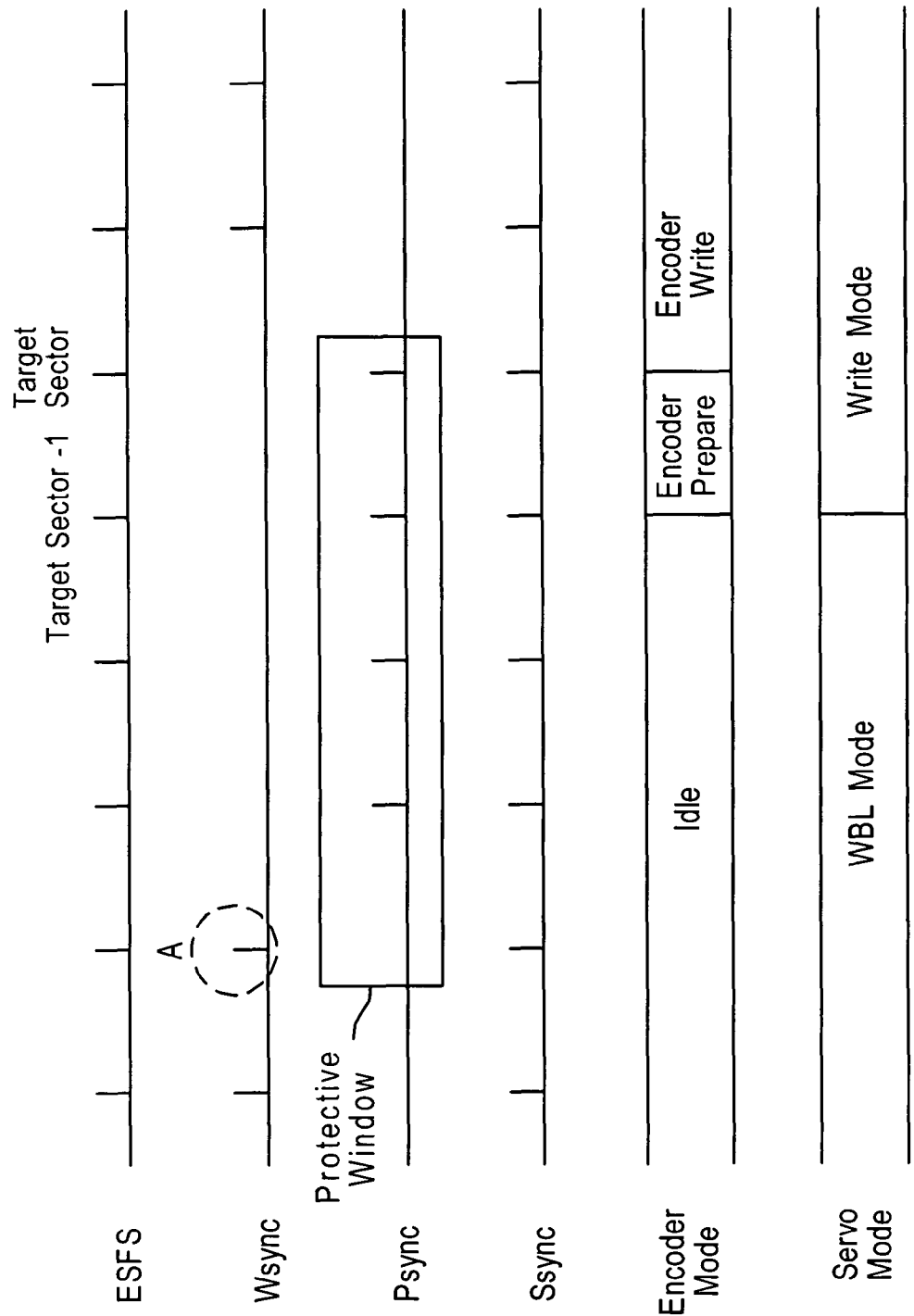
FIG. 4 is a schematic view of producing a pseudo synchronization signal in accordance with the invention.

FIG. 4 is a schematic view of producing a pseudo synchronization signal in accordance with the invention. As shown in FIG. 4, when the signal Wsync cannot be obtained from the optical disk, the protector 370 produces a pseudo synchronization signal in accordance with the last detected wobble synchronization signal (at label A). Accordingly, the write controller 380 can receive a synchronization signal Ssync (in this case, the signal Psync) without missing, and the synchronization signal Ssync is matched with the encoder sub-code frame synchronization (ESFS) signal.

Figure 5:
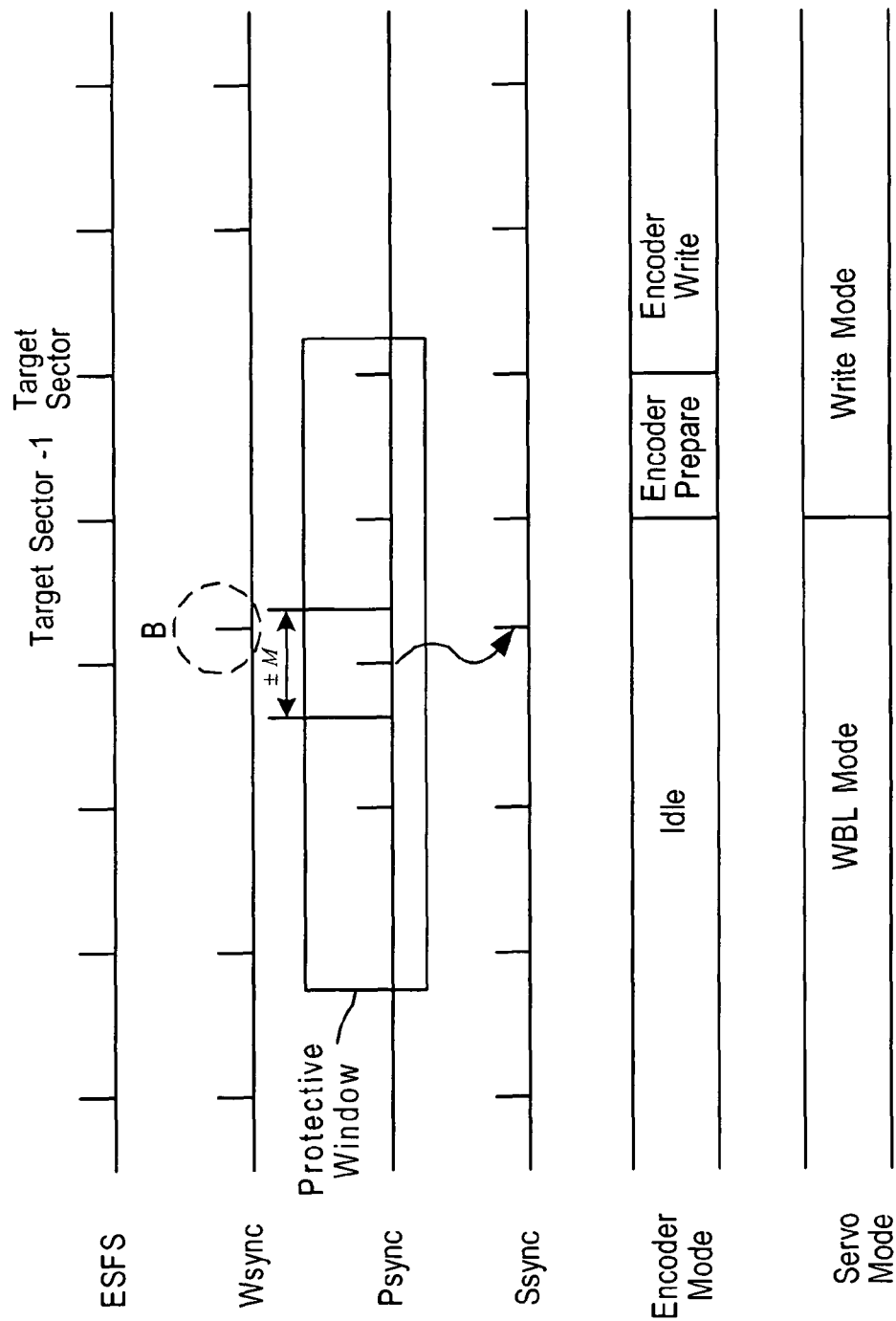
FIG. 5 is a schematic view of producing another pseudo synchronization signal in accordance with the invention.

FIG. 5 is a schematic chart of producing another pseudo synchronization signal in accordance with the invention. As shown in FIG. 5, when a wobble synchronization signal (at label B) of physical tracks is detected in the protective window and has a difference of ±M eight to fourteen modulation (EFM) signal from the pseudo synchronization signal Psync, the protector 370 corrects the difference by aligning the pseudo synchronization signal Psync with the detected synchronization signal (shown by arrow), where M is a positive integer that can be set as desired.

Referring again to FIG. 3, the wobble identification device 340 is connected to the wobble decoder 330 and the wobble PLL 320 in order to extract a wobble identification (wobble ID) of a current track of the optical disk and an identification status IDStatus from the wobble data Wdata. The target identification register comparator 350 is connected to the wobble identification device 340 in order to compare the wobble ID with a target identification TargetID. When the wobble ID of the current sector is equal to target identification minus one (TargetID−1), the comparator 350 produces a target identification ready signal TargetIDReady for output.

The write controller 380 is connected to the wobble synchronization detection and count device 360, the synchronization protector 370, and the target identification register comparator 350. When the write controller 380 receives the signal TargetIDReady and the signal TarSyncMatch or Psync, it produces a write signal to drive the optical disk drive to perform the write operation on the optical disk.

Figure 6:
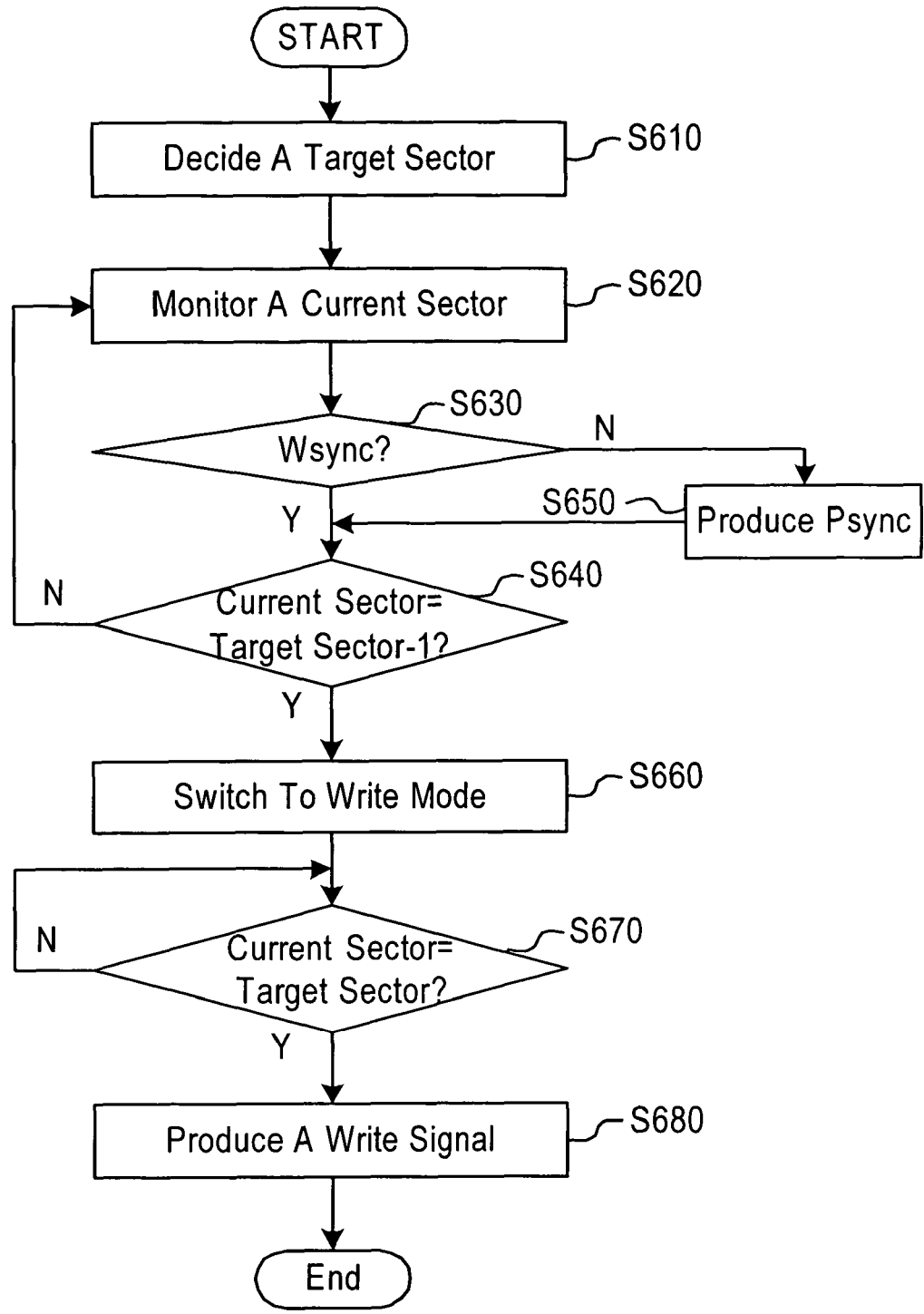
FIG. 6 is a flowchart of a protective method for data write of an optical disk drive in accordance with the invention.

FIG. 6 is a flowchart of a protective method for data write of an optical disk drive in accordance with the invention. As shown in FIG. 6, step S610 decides a target sector for a write operation. In step S620, the servo device 310 monitors a current sector of an optical disk in order to drive a spindle motor to rotate a target track on the optical disk to a position below a pickup head.

Step S630 determines whether a wobble synchronization signal Wsync is possibly extracted from the optical disk; if yes, step S640 is executed; and if not, step S650 is executed. In step S650, the synchronization protector 370 produces a pseudo synchronization signal Psync in accordance with the last detected wobble synchronization signal.

Step S640 determines if the current sector is the sector before the target sector. If the number of the current sector is equal to a number of target sector minus one (target sector−1), then the current sector is the sector before the target sector and step S660 is executed; and if not, step S620 is executed. In step S660, the servo device 310 is switched from WBL mode to write mode. Step S670 determines if the current sector is the target sector; if yes, step S680 is executed; and if not, step S670 is executed. When the process returns to the step S670, because the spindle motor drive the optical disk, the number of current sector of the optical disk is changed. In step S680, the write controller 380 produces a write signal to drive the optical disk drive to perform the write operation on the optical disk.

The invention adaptively produces an alternate pseudo synchronization signal when the optical disk drive cannot obtain the signal Wsync from the optical disk, thereby allowing the optical disk drive to perform the write operation on the optical disk. However, for a seriously damaged optical disk, a write signal is terminated because the ESFS (encoder sub-code frame synchronization) signal produced by the encoder cannot be synchronized with the wobble synchronization signal Wsync on the optical disk in a preset time after the disk write is started, even if the inventive pseudo synchronization signal Psync is produced to activate the write signal.

As cited, when the optical disk drive cannot obtain the signal Wsync from an optical disk, the invented synchronization protector 370 adaptively produces the alternate pseudo synchronization signal, thereby allowing the optical disk drive to perform the write operation on the optical disk. Thus, the unwritable problem caused by missing the signal Wsync is overcome, and the write yield of the optical disk is further increased.

Although the present invention has been explained in relation to its preferred embodiment, it is to be understood that many other possible modifications and variations can be made without departing from the spirit and scope of the invention as hereinafter claimed.

What is claimed is:

1. A protective system for data write of an optical disk drive, which produces a pseudo synchronization signal in order to allow the optical disk drive to perform a write operation on an optical disk, the system comprising:
   a wobble synchronization detection and count device, which receives a wobble synchronization signal extracted from the optical disk and a wobble synchronization status, and outputs a target synchronization match signal when the wobble synchronization status is at ready and outputs a synchronization miss signal when the wobble synchronization signal cannot be extracted from the optical disk and the wobble synchronization status is at fail;
   a synchronization protector, which is connected to the wobble synchronization detection and count device and produces the pseudo synchronization signal by receiving the synchronization miss signal for indicating that the optical disk drive cannot properly obtain the wobble synchronization signal from the optical disk, wherein the synchronization protector produces the pseudo synchronization signal in accordance with a last detected wobble synchronization signal; and
   a write controller, which is connected to the wobble synchronization detection and count device and the synchronization protector and produces a write signal by receiving the target synchronization match signal or the pseudo synchronization signal, thereby driving the optical disk drive to perform the write operation on the optical disk.

2. The system as claimed in claim 1, further comprising:
   a servo device, which reads a wobble signal from the optical disk and converts the wobble signal into a digital wobble signal; and
   a wobble decoder, which is connected to the servo device in order to extract the wobble synchronization signal, the wobble synchronization status and a wobble data from the digital wobble signal.

3. The system as claimed in claim 2, further comprising:
   a wobble phase locked loop (PLL), which is connected to the servo device in order to extract a wobble clock from the digital wobble signal.

4. The system as claimed in claim 3, further comprising:
   a wobble identification device, which is connected to the wobble decoder and the wobble PLL in order to extract a wobble identification of a current track of the optical disk and an identification status from the wobble data; and
   a target identification register comparator, which is connected to the wobble identification device in order to compare the wobble identification of the current track of the optical disk with a target identification, and accordingly produce a target identification ready signal when the wobble identification of the current track is equal to the target identification minus one, thereby driving the write controller to produce the write signal in accordance with the target synchronization match signal or pseudo synchronization signal received.

5. A protective method for data write of an optical disk drive, which produces a pseudo synchronization signal extracted from an optical disk in order to allow the optical disk drive to perform a write operation on the optical disk, the method comprising the steps of:
   (A) determining a write target sector;
   (B) monitoring a current sector of the optical disk;
   (C) determining whether a wobble synchronization signal is possibly extracted from the optical disk;
   (D) producing the pseudo synchronization signal in accordance with a last detected wobble synchronization signal when step (C) decides that the wobble synchronization signal cannot be extracted from the optical disk, wherein step (D) further comprises:
   (D1) determining if the current sector of the optical disk is a sector immediately before the write target sector; and
   (D2) switching the optical disk drive to a write mode when step (D1) decides that the current sector of the optical disk is the sector immediately before the write target sector; and
   (E) driving the optical disk drive to perform the write operation on the optical disk.

6. The method as claimed in claim 5, wherein step (D) further comprises the steps of:
   (D3) determining if the current sector of the optical disk is the write target sector; and
   (D4) executing step (E) when step (D3) decides that the current sector of the optical disk is the write target sector.

7. The method as claimed in claim 6, wherein step (D3) is repeatedly executed when the current sector of the optical disk is not the write target sector.

8. The method as claimed in claim 5, wherein step (B) is executed when step (D1) decides that the current sector of the optical disk is not the sector immediately before the write target sector.

* * * * *